United States Patent [19]
Grallert et al.

[11] 4,120,572
[45] Oct. 17, 1978

[54] MULTIPLE FILM TYPE MOTION PICTURE PROJECTION

[75] Inventors: Michael Grallert, Brunswick; Jörg Moschner, Salzgitter-Lebenstedt, both of Fed. Rep. of Germany

[73] Assignee: Rollei-Werke Franke & Heidecke, Brunswick, Fed. Rep. of Germany

[21] Appl. No.: 752,928

[22] Filed: Dec. 21, 1976

[30] Foreign Application Priority Data
Dec. 24, 1975 [DE] Fed. Rep. of Germany ....... 2558747

[51] Int. Cl.² .............................................. G03B 21/50
[52] U.S. Cl. ........................................ 352/92; 352/10; 352/79; 352/80
[58] Field of Search ..................... 352/10, 92, 79, 80

[56] References Cited
U.S. PATENT DOCUMENTS

| | | | |
|---|---|---|---|
| 3,685,890 | 8/1972 | Sekera | 352/79 |
| 3,704,941 | 12/1972 | Winkler et al. | 352/92 |
| 3,704,999 | 12/1972 | Hutner | 352/92 |
| 3,843,241 | 10/1974 | Swerdlow et al. | 352/10 |
| 3,888,780 | 6/1975 | Tucker | 352/92 |

FOREIGN PATENT DOCUMENTS
1,964,728  7/1971  Fed. Rep. of Germany ............ 352/92

OTHER PUBLICATIONS
IBM Technical Disclosure, vol. 11, #10, Mar. 1969, p. 1191.

Primary Examiner—Russell E. Adams
Attorney, Agent, or Firm—Smyth, Pavitt, Siegemund, Jones & Martella

[57] ABSTRACT

A movie projector for narrow film with sound track is adapted to different operating conditions corresponding, for example, to different sound film types, by means of control inititated by the film itself upon insertion. The leader of the film is provided with markings being disposed outside of the sound track and characterizing the type of film that is appended to the leader. The markings are optically and/or magnetically readable by a pickup device that may be shared with the sound reproduction. The markings as read are counted or assembled and decoded for controlling the operating conditions of the projector concerning, for example, the picture frame rate, the type of sound track, and similar projector conditions. Such markings can also be used on the film proper to change the operating state of the projector automatically during projection.

7 Claims, 10 Drawing Figures

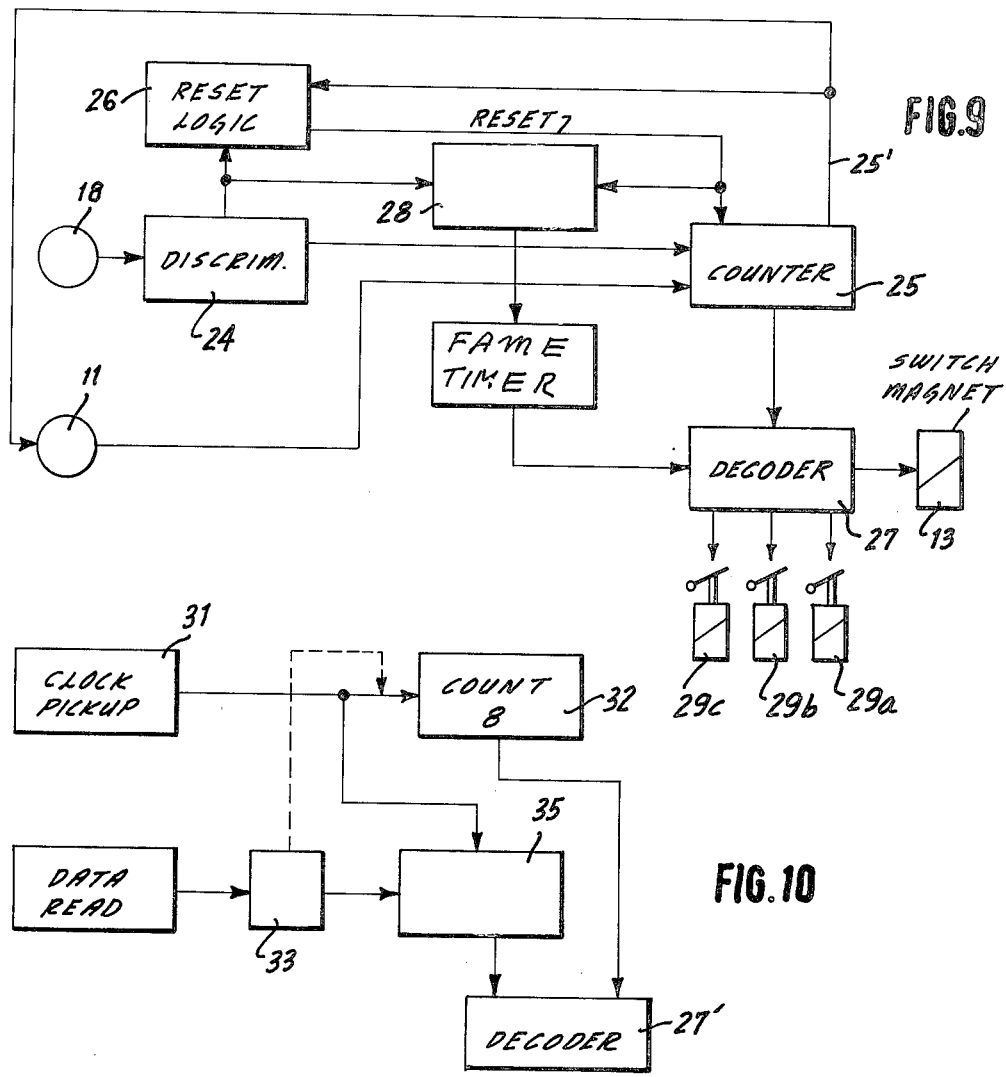
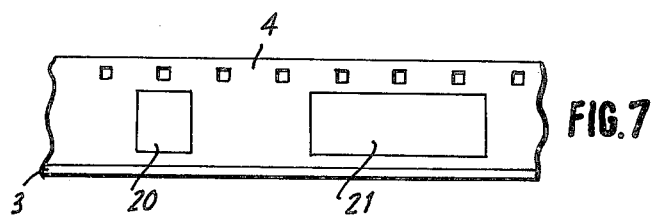
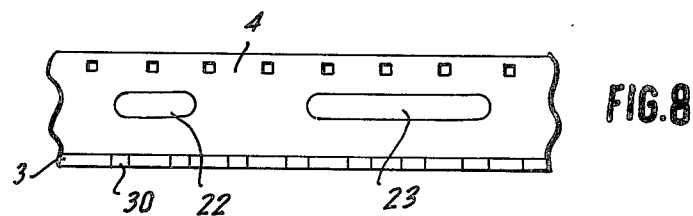

MULTIPLE FILM TYPE MOTION PICTURE PROJECTION

BACKGROUND OF THE INVENTION

This invention relates to the reproduction of sound film in a motion picture projector which can be operated in different modes of operation, corresponding to different types of film.

Motion picture films with sound track are made in accordance with different standards concerning the number of pictures per unit of time (16 and 24 pictures per second). Also, the type of sound recording (magnetical or optical sound tracks) and the picture size (for example, regular 8 mm and super 8 mm) is different for different types of sound film. Accordingly, universal projectors are available in the trade which can be adapted or adjusted to the different operating conditions so that all of the different types of motion picture films can be projected with such a projector. If, however, the necessary changes have not been made, the projector may break down, possibly, damage the film.

DESCRIPTION OF THE INVENTION

It is accordingly an object of the present invention to provide for the visual/audio reproduction of motion picture sound film which is automatically adapted to the type of film being reproduced.

It is another object of the present invention to provide a projector which automatically adapts itself to the type of film being projected.

It is a particular object of the present invention to provide a new and improved projector wherein upon insertion or automatical threading of the film, the projector is automatically adapted to that film prior to actual projection in accordance with the specific mode of operation of that particular film.

In accordance with the preferred embodiment of the present invention, it is suggested to provide machine readable marks such as optical contrast producing indicia or magnetically marks or a combination of both and which characterize the type of film being inserted in the projector. These markings are provided specifically on the leader of the film, but may be provided also in the film, even at the end portion but preferably outside of the sound track. The projector is provided for reading these markings, and a circuit responds to the pulses generated by the pickup and reading device for controlling the operating conditions of the projector. The control may involve counting the number of markings as read or digitally interpreting them as a group of bi-valued bits. In either case, the count result or the bit combination is decoded and the result of decoding is used to control the operation of the projector. This control will involve enabling the proper sound track reader, i.e., an optical detector or a magnetic transducer. The control will also involve selection of the proper frame rate and film speed, possibly also selection of the needed sprocket wheel.

Preferably, the existing pickup heads for sound track reading are also used for reading the film identifying markings. In this case, an electro-optical pickup head and a magnetic pickup and reproduce head are disposed on a carriage being movable transversely to the direction of the film. Initially, the carriage has a disposition so that the pickup heads are disposed above the center of the film, to search for the markings. Thereafter, the carriage is moved to place these pickup devices above the sound track along the edge of the film strip.

The projector may be provided in addition with magnetic record and erase heads. These heads should be also on that carriage but laterally offset to the aforementioned pickup devices, so that the record and erase heads are moved off the track whenever the pickup devices are in track reading position. This arrangement largely minimizes an increase of equipment for the projector. Also, in this manner, the safety of operation is increased and additionally, it is prevented that any previously made sound track recording is accidentally erased during reproduction.

As stated, the control markings or the leader determine the state of operation of the projector at least for the beginning of optical-audio reproduction. Markings placed downstream of the film can be used to automatically trigger specific functions of the reproduction device corresponding to the particular film. For example, specific markings may control a temporary interruption of the presentation after a predetermined sequence of scenes, other markings may trigger the fast advance of the trailing portion of the film, still other markings may initiate an automatic rewind with or without an automatic repetition of the presentation (continuous projection). It should be noted that in the case of markings on the film strip to be effective during reproduction, it is not possible to utilize the pickup heads on a function-sharing basis for reading the sound tracks and the latter type markings.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 7 is a plan view of a film leader carrying marks for generating groups of pulses representing a particular combination of logical or zeros and ones, i.e. bi-valued bits;

FIG. 8 is a plan view similar to that of FIG. 7, and showing another way of providing such markings on the film strip;

FIG. 9 is a block diagram of the control circuit for the projector applicable to processing markings as per FIG. 1; and FIG. 10 is a block diagram of the control circuit responsive to data as per FIGS. 7 and 8.

Proceeding now to the detailed description of the drawings, FIG. 1 illustrates a rather simple way of practicing the present invention. Between at least a front end portion of a leader 1 of a motion picture film and the beginning of the picture frames 2 as well as of the sound track 3, a film code and identifying portion 4 is provided which may actually be a portion of the leader. The code section 4 is shown next to portions of the film having the frames. However, the leader is often quite long so that it may be necessary to place this encoding section 4 not too far from the leading edge 1a of the leader, well ahead of film strip 2.

Figure 1:
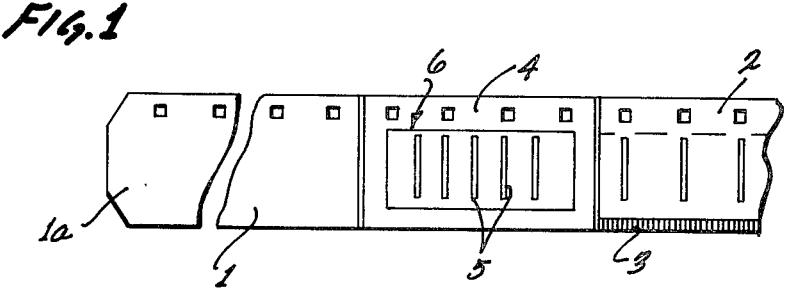
FIG. 1 is a plan view of the beginning portion of a film with markings in accordance with the present invention.

The portion 4 carries, for example, a data field 6 for transverse strips 5 which constitute the film type and operation defining indicia. Since a film leader is usually more or less opaque, the strips 5 should be transparent; they may possibly even be constituted by slits transversing the film material. Of course, if the leader 1 is transparent, strips 5 will be opaque. However, in some instances film leaders are not completely opaque, only semitransparent, or just translucent to a limited degree. In this case, completely opaque strips will serve best. The code section 4 may simply be made in that an encoded strip 6 (data field) is just glued on the leader 1. This data field contains either the transparent slits 5 upon a completely opaque background or opaque strips on a transparent background. In other words, the data field as such is defined to permit establishing maximum contrast for the markings for better discrimination against background contrasts.

Since the purpose of the invention is to automatically adapt a projector to built-in versatility that versatility can, in turn, be made use of for the adaption. Thus, the film type encoding does not have to be optical in nature but can be magnetic. For an electromagnetic scanning, the data field 6 may, for example, be a strip of magnetic tape which has been bonded to leader 1 or the code section may simply consist of a spliced-in magnetic tape strip.

It should be noted here that both possibilities of encoding and pickup can be combined, if, for example, an opaque background strip having transparent data strips, is a magnetized tape strip whose magnetic layer has been removed for the strips 6 exposing a frequently translucent or transparent substrate. The thus defined optical transparent markings serve now also as magnetic markings in that they represent absence of magnetization while the opaque magnetic tape represents presence of magnetization. Thus, the leader is now provided so that its encoding section can be used both for an optical scan as well as for a magnetic scan.

A film strip with a leader as described can be used to generate a number of pulses corresponding to the number of markings 5. The timing of the pulses depends on the speed of motion of the film, but the number per se is independent of that motion. Hence, as will be described later in this specification, the number of markings 5 may per se identify the type of film, so that just a counting process is needed to ascertain this data. As stated, this is a rather simple form of practicing the invention; a more sophisticated approach will be discussed still later.

Figure 2:
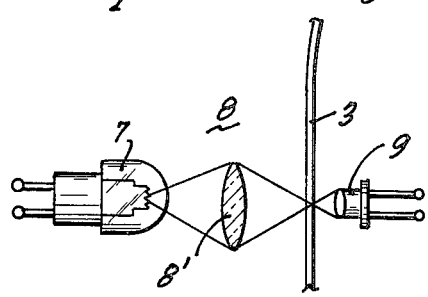
FIG. 2 is a side elevational view of apparatus for optically reading the marks.

Since the main purpose of the invention is to automatically adapt motion picture projection to the type of film being fed, the projector must include an optical pickup system and a magnetic pickup system for the respective type of sound track. The optical pickup system 8 (see FIG. 2) includes a lamp 7 having an optical system 8 and a photoelectric detector 9 such as a light sensitive transistor being illuminated through the film. The optical pickup system is disposed on a carriage 10 (see FIGS. 3 and 4) which is movable transversely to the direction of motion of the film so that the optical pickup system 8 can be selectively moved into the longitudinal axis of the film or positioned over the sound track 3. In the first position shown in FIG. 3, the film identifying marks are optically scanned and in the second position shown in FIG. 4 the sound track 3 is scanned.

Reference numeral 11 refers to a magnetic pickup head and transducer being also disposed on the carriage and provided for picking up audio signals as recorded on a magnetic sound track and/or magnetic identifying marks of data field 6. The head 11 is aligned with pickup system 8 in the direction of film advance. Also, head 11 will be moved to a position above the sound track when the carriage is shifted to the FIG. 4 position.

In addition, the carriage may carry a sound recording head 11' and an erase head 12. These two heads are provided in such an orientation that the erase head 12 and the sound recording head 11' are disposed above the sound track 3 when carriage 10 is arranged to read the marks (position of FIG. 3). During the sound reproduction position both heads 11' and 12 are disposed outside of the sound track as shown in FIG. 4.

The carriage 10 is disposed on a support 18 constructed as a bed or track on which carriage 10 can slide. The carriage is controlled in that it is permitted to have only one out of two positions. This is effected by a simple electromagnet or solenoid 13 (see FIGS. 5 and 6) working against the action of a spring 14 when energized. The magnet 13 operates a two arm lever 15, and in cooperation with spring 14 carriage 10 is shifted into one of the two possible positions which are respectively defined by two limit stops 16 and 17.

Figure 3:
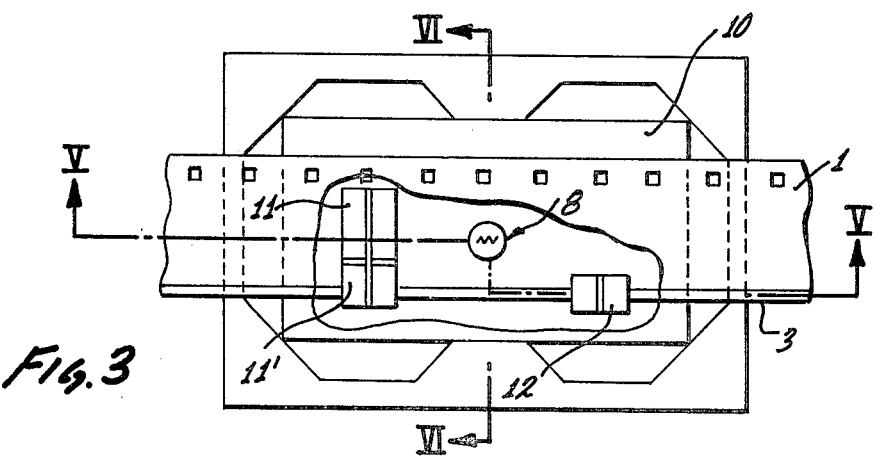
FIG. 3 is a plan view of a pickup device in the position for reading the marks.
Figure 4:
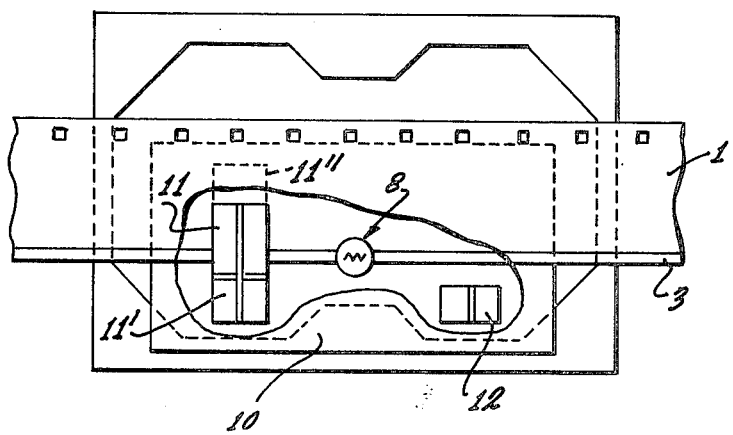
FIG. 4 is a plan view similar to that of FIG. 3 but showing the pickup device in a position for sound track reading.
Figure 5:
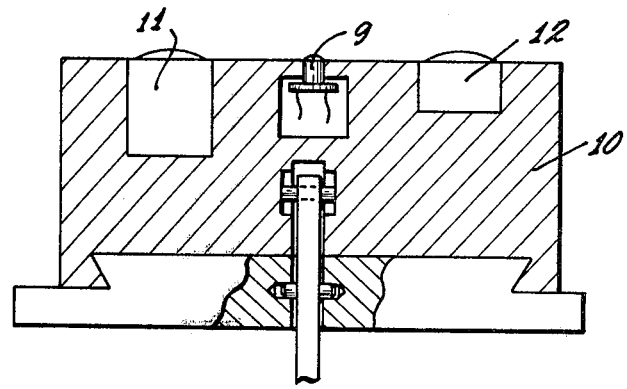
FIG. 5 is a longitudinal section along lines V—V in FIG. 3.
Figure 6:
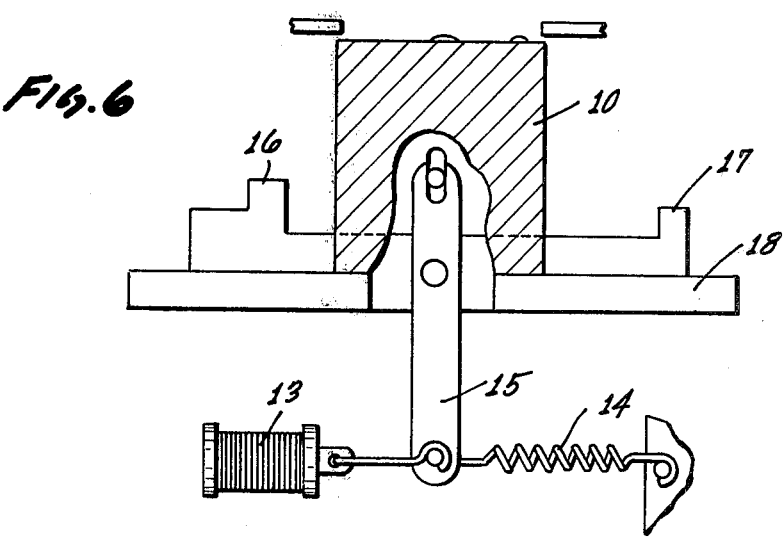
FIG. 6 is a cross section along line VI—VI of FIG. 3.

The position of the carriage for reading the marks is shown in FIG. 3 and the electro-optical sound pickup device 8, as well as the electromagnetic sound pickup head 11 are positioned above the longitudinal axis of the film. The carriage position for this operating state is also shown in FIGS. 5 and 6. By displacing the carriage 10 to the position of FIG. 4, erase head 12 and recording head 11' are moved out of the region of the sound track while the electro-optical scanning and the magnetic sound pickup head move upon the sound track.

Depending upon the relative position of the two systems, that is the electro-optical or the magnetic system, in relation to the film advance, the first one should always be effective and connected to determine the marks 5, so that they can be counted. The second pickup system in line is effective only if the first one did not respond. As illustrated, the optical system is first in line, but if the markers 5 are purely magnetic indicias, optical pickup 8 will not respond and transducer 11 will now pick up the markings. In the case of a dual type data field 6, response of pickup 8 must block response of head 11.

The control as provided is shown in FIG. 9. The optical pickup 8, and here particularly the transistor 9, respond to markings on the leader. As placement of the field 6 may be uncertain, and since the front end of leader 1 may have printed on markings unrelated to the identifying indicias, it may be necessary to detect at first whether or not markings read are true data field markings or unrelated contrasts. Hence, a discrimination circuit 24 determines at first whether or not optical markings as read are true markings. Since it can be presumed that upon turn on the film is advanced into the projector at a particular speed (which may not be the correct one, however), markings 5 must pass the pickups 8, 11 at a particular rate. Thus, a true second, a true third, etc., optical marking can occur only a particular period after a first true marking has been detected. Circuit 24 is provided to generate a looking window following each marking as detected. No such discrimination is needed for magnetic pickup, because one can reasonably expect that there is no magnetic noise on the leader or other portions of the film strip.

Circuit 24 includes a timing circuit which is triggered by each marking. The circuit may include two monostable devices, both being triggered by each passing marking but one reverts before the other, and the next marking must occur before the second monostable device has run but after the first one reverted so that the looking window is defined by the unequal states of these two monostable multivibrators. These unequal states are logically ascertained as gating conditions for the next marking to be regocnized as such. Any marking so recognized, plus the first one, are set into a counter 25.

The discrimination against optical background can be augmented or provided differently as follows. For example, the markings 5 on field 6 may provide for the largest contrast that would occur on the leader. Hence, the markings can be recognized through amplitude thresholding, they produce a larger amplitude swing than any other contrast.

The number of markings may in all instances be above a particular minimum, so that that minimum number of markings must be detected first. Therefore, the circuit 24 includes a third monostable device which is triggered by the first marking and provides a reset pulse for counter 25 which is effective only if the counter 25 has not reached the minimum count state after a period in which it must have counted that minimum number, if the markings counted are genuine. The reset logic 26, therefore, responds to the count state of counter 25 and to that reset pulse, and suppresses it, if in fact, the count state is what it should be for detection of proper markings.

The signal from counter 25 (line 25') indicating minimum count as per optical pickup is also used to disable the electromagnetic pickup to avoid confusing redundancy. However, if there is no such disabling signal, a magnetic pickup from transducer 11 is fed to the counter 25 for the detection of markings. It can thus be seen that the system does not inherently require a particular mode of indicia representation.

Reference numeral 27 refers to a decoder logic that is connected to the counter 25 to ascertain the count state in representation of the film type. A decision circuit 28 may respond to the suppress reset pulse situation, i.e., a counter reset pulse from 24 produced after the minimum number of markings must have passed, but no reset pulse issued to counter 25 because the proper minimum of pulses was counted. This situation represents actually the detection of a data field, and starts a frame timer which, when have run, establishes with certainty that all markings that could possibly occur (largest number) have been counted (or less) to enable the decoder 27.

The decoder 27 operates switches such as 29a, 29b and others which perform various functions. For example, switch 29a may control whether the sound pickup is optical or magnetic, i.e., it will connect either the photo detector 9 or the magnetic pickup head 11 to the sound reproduction circuit. Switch 29b may adjust the motor speed by adding or subtracting windings or by adapting the projector otherwise to the needed rate of progression and frame rate. Also, this switch 29b may control the placement of the proper sprocket wheel in the path of the film. Switch 29c may control a reversal of the motor.

Decoder 27 will also trigger solenoid 13 to cause the carriage 10 to be shifted from the code reading position (FIG. 3) to the sound track scanning position (FIG. 4).

When the projector is controlled by markings on the film not only at the beginning but during the time the film is being projected or at the end of the film projection, the sound track pickup system must be supplemented by a second head 11" with respect to the reprocuding head 11. The second head 11" is disposed over the middle of the film even when the carriage has been moved to the position of FIG. 4, that is it is able to read magnetic film marks provided in that region. In this case, a second electro-optical pickup system, analogous to the additional pickup head 11" cannot be used because such optical pickup may not reliably distinguish the control markings from the picture content of the film.

FIGS. 7 and 8 illustrate two further embodiments for the film marks which can be easily applied. These provide the possibility to store a substantially greater number of control information. The encoding system cooperates here directly with the sprocket holes or with additional magnetic markings 30. In the latter case, one could use, for example, the record head 11' in the reproduce mode and the magnetic markings 30 may actually be part of an extended piece of sound track. In the case of using the sprocket holes, one needs an additional optical pickup, i.e. one cannot share it with both, audio and markings reading. In either case, such a supplementary transducer (broadly identified in FIG. 10 by numeral 31) provides clock pulses to operate an electronic shift register 35 having serial input and parallel output.

The shift register may, for example, provide storage for 8 bits (Ser. No. 74,164). The data field is, thus, identified by the film strip region adjacent to 8 sprocket holes (or markers 30). By pasting opaque bands 20, 21 (or magnetized bands) on the data field area 4, or by providing cutouts 22, 23 in the otherwise opaque film material, the value of the scanned information is determined as a specific combination of logic 0's or logic ones. The data field is scanned as described above and for 8 sprocket holes a series of 8 bits is serially fed into the 8 bit shift register 31.

Discrimination against background is relatively simple if magnetic markings such as 30 are used, because their mere presence identifies the data field. If one uses the sprocket holes, data is actually continuously shifted into the shift register. The encoding pattern may include error detection check marks (parity, error correction coding etc.) to digitally disccriminate a data field content of the shift register from random contrast data therein. Thus, the data field detection logic 32 includes a counter to count 8 (or whatever number has been chosen for the length of the data field) magnetic pulses, or circuit 32 continuously decodes the content of register 35 on the basis of the correction check. Alternatively, a threshold detection circuit 33 may be included in the data path to suppress clock pulses until a true data edge has been detected whereupon counter 32 is permitted to count 8 optically detected sprocket pulses. This mode of discrimination requrires the data field to begin always with an opaque marking, or a cut-out as the case may be.

The output of register 35 is outputted in parallel to operate a decoder such as 27' which, in turn, operates the appropriate control circuitry in the projector for purposes of adapting it to the type of film as identified by the digital coding. Thus, for each particular pulse group as stored in the shift register 35, a predetermined switching sequence or a predetermined corresponding switching of the projector can be triggered. Data field detection as such locks the state of the projector. The shift register may be cleared thereafter and is ready for the next series of marks on the film or another film.

It is also possible to arrange the marks and the clocking markings independently of the position of the sprocket holes. This mode of encoding may be useful if the clock marks are disposed as control marks upon a magnetic tape on the leader or on any other desired place on the film or at the end of the film. The function of the electronics can be made independent of the speed with which the film moves through the pickup position.

The number of bit combinations obtainable in the above-described manner permits to divide the switching sequence and operation of the projector into several stages. For example, one can use different data fields along the leader to sequence the switching steps and different code numbers and code number ranges pertain to different types of operations.

The invention is not limited to the embodiments described above but all changes and modifications thereof not constituting departures from the spirit and scope of the invention are intended to be included.

We claim:

1. In a motion picture projector constructed for different operating conditions corresponding to different types of film, the projector including different sound pickup systems, such films having a leader portion provided with machine readable markings which characterize the particular type of film, the combination comprising:
   a carriage disposed for movement transversely to the film;
   pickup means on the carriage for reading the markings on said leader portion and generating pulses in response thereto, the carriage having a position so that the pickup means is disposed above the center of the film;
   circuit means including logic decoding means coupled to said pickup means for receiving therefrom said pulses and providing control signals representative of the type of film as identified by the markings; and
   control means coupled to said circuit means and operable by said signals for switching predetermined operating conditions in the projector including selection of frame rate of reproduction selection of a sound reproducing system in the projector and shifting the carriage so that the pickup means becomes disposed above a sound track of the film.

2. In a projector, the combination of claim 1, said pickup means being an optical detector and an electromagnetic transducer.

3. In a projector as in claim 1, and the pickup means including a magnetic record head as well as a magnetic erase head disposed on the carriage, and in that the record head and the erase head are disposed above the sound track only when the carriage is in the position for reading the marks by said pickup means.

4. Apparatus for controlling a motion picture projector having pickup means for optical and magnetic sound track reading, a portion of a film strip carrying machine readable markings for identifying the film, the markings identifying the type of sound track recording on the film; comprising:
   the pickup means being disposed for reading the said film strip portion upon insertion thereof in a projector;
   means for controlling operating states of the projector for reproducing the film strip in response to the markings as read during the reading step, including means for controlling the projector as to the type of sound track pickup needed for sound reproduction; and
   means for repositioning the sound track pickup means above the sound track.

5. In an apparatus as in claim 4, the controlling means including means for decoding the markings as read, and means for controlling the operating state in dependence upon the result of the decoding.

6. In an apparatus as in claim 5, the means for decoding being provided for counting the markings as read, the means for controlling operating in dependence upon a result of the counting.

7. In an apparatus as in claim 5, wherein the decoding means includes means for processing the markings as read as bi-valued bits, and decoding the bits as a group.

* * * * *

UNITED STATES PATENT AND TRADEMARK OFFICE
CERTIFICATE OF CORRECTION

PATENT NO. : 4,120,572

DATED : October 17, 1978

INVENTOR(S) : Michael Grallert, et al

It is certified that error appears in the above-identified patent and that said Letters Patent are hereby corrected as shown below:

[75]  Michael Grallert, Braunschweig;
      Jörg Moschner, Salzgitter-Lebenstedt;
      both Fed. Rep. of Germany

[73]  Rollei-Werke Franke & Heidecke,
      Braunschweig, Fed. Rep. of Germany

*Signed and Sealed this*

*Twenty-seventh* Day of *February 1979*

[SEAL]

*Attest:*

RUTH C. MASON
*Attesting Officer*

DONALD W. BANNER
*Commissioner of Patents and Trademarks*